(12) United States Patent
Kita

(10) Patent No.: US 11,241,957 B2
(45) Date of Patent: Feb. 8, 2022

(54) ACCELERATOR DEVICE

(71) Applicant: DENSO CORPORATION, Kariya (JP)

(72) Inventor: Takuto Kita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/338,213

(22) Filed: Jun. 3, 2021

(65) Prior Publication Data
US 2021/0291649 A1 Sep. 23, 2021

Related U.S. Application Data

(63) Continuation of application No. PCT/JP2019/047401, filed on Dec. 4, 2019.

(30) Foreign Application Priority Data

Dec. 11, 2018 (JP) .............................. JP2018-231500

(51) Int. Cl.
| | | |
|---|---|---|
| *B60K 26/02* | (2006.01) | |
| *G05G 1/44* | (2008.04) | |
| *G05G 5/05* | (2006.01) | |
| *G05G 25/02* | (2006.01) | |

(52) U.S. Cl.
CPC ............... *B60K 26/02* (2013.01); *G05G 1/44* (2013.01); *G05G 5/05* (2013.01); *G05G 25/02* (2013.01); *G05G 2505/00* (2013.01)

(58) Field of Classification Search
CPC .. G05G 1/30; G05G 1/36; G05G 1/38; G05G 1/40; G05G 1/405; G05G 1/44; G05G 1/445; B60K 26/02; B60T 7/04; B60T 7/05

See application file for complete search history.

(56) References Cited

U.S. PATENT DOCUMENTS

| | | | |
|---|---|---|---|
| 7,012,423 B2* | 3/2006 | Hasegawa | G05G 1/30 324/207.25 |
| 2002/0152831 A1* | 10/2002 | Sakamoto | G05G 5/03 74/512 |

(Continued)

FOREIGN PATENT DOCUMENTS

JP 2018103943 A * 7/2018 ............. B60K 26/02

OTHER PUBLICATIONS

Machine Translation of JP 2018-103943, obtained Oct. 6, 2021.*

*Primary Examiner* — Richard W Ridley
*Assistant Examiner* — Brian J McGovern
(74) *Attorney, Agent, or Firm* — Nixon & Vanderhye P.C.

(57) ABSTRACT

An accelerator device includes a housing, a rotary shaft, and an operating member. The operating member is configured to move in an opening direction and a closing direction. The operating member includes a first contact portion arranged at a first distance from the rotary shaft and a second contact portion arranged at a second distance from the rotary shaft. When the first contact portion has an initial shape and the operating member is located at the accelerator idle position, the second contact portion is arranged at a predetermined distance from the inner wall. When the first contact portion is deformed more than a predetermined volume from the initial shape and the operating member is located at the accelerator idle position, the second contact portion is in contact with the inner wall.

4 Claims, 10 Drawing Sheets

(56) References Cited

U.S. PATENT DOCUMENTS

| | | | |
|---|---|---|---|
| 2015/0176505 A1* | 6/2015 | Viet | G05G 5/05 |
| | | | 74/514 |
| 2015/0192076 A1* | 7/2015 | Jordan | B60K 26/02 |
| | | | 74/514 |
| 2018/0135726 A1 | 5/2018 | Kita et al. | |
| 2019/0264620 A1 | 8/2019 | Moritani et al. | |

* cited by examiner

ACCELERATOR DEVICE

CROSS REFERENCE TO RELATED APPLICATIONS

The present application is a continuation application of International Patent Application No. PCT/JP2019/047401 filed on Dec. 4, 2019, which designated the U.S. and claims the benefit of priority from Japanese Patent Applications No. 2018-231500 filed on Dec. 11, 2018. The entire disclosures of all of the above applications are incorporated herein by reference.

TECHNICAL FIELD

The present disclosure relates to an accelerator device.

BACKGROUND

A known accelerator device includes a rotary shaft and an operating member. The operating member is formed integrally with the rotary shaft and is moved by a rotation of the rotary shaft between an accelerator idle position and an accelerator full-throttle position

SUMMARY

According to one aspect of the present disclosure, an accelerator device is provided. The accelerator device includes a housing, a rotary shaft, and an operating member. The housing is configured to be attached to a vehicle body. The rotary shaft is supported in the housing and configured to rotate. The operating member is configured to be moved between an accelerator idle position and an accelerator full-throttle position, and is biased toward the accelerator idle position. The operating member includes a first contact portion and a second contact portion. The first contact portion is arranged at a first distance from the rotary shaft and is configured to be deformed by a contact with an inner wall of the housing when the operating member is located at the accelerator idle position. The second contact portion is arranged at a second distance longer than the first distance from the rotary shaft. When the first contact portion has an initial shape and the operating member is located at the accelerator idle position, the second contact portion is arranged at a predetermined distance from the inner wall. When the first contact portion is deformed more than a predetermined volume from the initial shape and the operating member is located at the accelerator idle position, the second contact portion is brought into contact with the inner wall.

BRIEF DESCRIPTION OF DRAWINGS

The above and other objects, features and advantages of the present disclosure will become more apparent from the following detailed description made with reference to the accompanying drawings.

DETAILED DESCRIPTION

Figure 1:
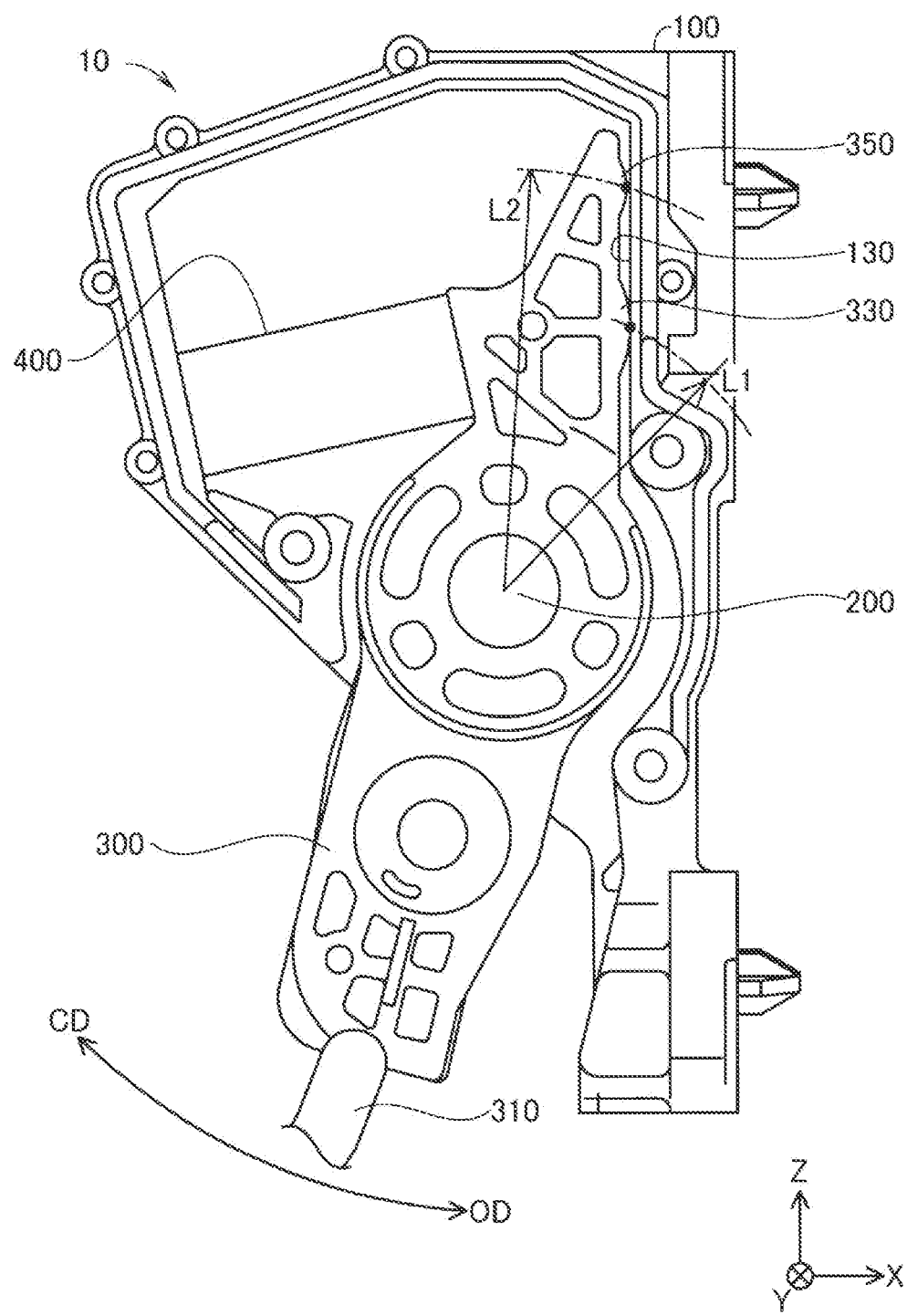
FIG. 1 is a schematic view illustrating an accelerator device according to a first embodiment.

An accelerator device may include a rotary shaft and an operating member. The operating member is formed integrally with the rotary shaft and is moved by a rotation of the rotary shaft between an accelerator idle position and an accelerator full-throttle position In the accelerator device described above, the operating member includes a contact portion in contact with an inner wall of a housing when the operating member is located at an accelerator idle position. In the accelerator device, when the operating member is moved toward the accelerator idle position, impact noise is generated as the contact portion is brought into contact with the inner wall of the housing. Therefore, in the accelerator device, a volume of the impact noise is to be reduced.

According to one aspect of the present disclosure, an accelerator device is provided. The accelerator device includes a housing, a rotary shaft, and an operating member. The housing is configured to be attached to a vehicle body. The rotary shaft is supported in the housing and configured to rotate. The operating member is configured to be moved between an accelerator idle position and an accelerator full-throttle position, and is biased toward the accelerator idle position. The operating member includes a first contact portion and a second contact portion. The first contact portion is arranged at a first distance from the rotary shaft and is configured to be deformed by a contact with an inner wall of the housing when the operating member is located at the accelerator idle position. The second contact portion is arranged at a second distance longer than the first distance from the rotary shaft. When the first contact portion has an initial shape and the operating member is located at the accelerator idle position, the second contact portion is arranged at a predetermined distance from the inner wall. When the first contact portion is deformed more than a predetermined volume from the initial shape and the operating member is located at the accelerator idle position, the second contact portion is brought into contact with the inner wall.

In a comparative example, an accelerator device includes only one contact portion in contact with the inner wall of the housing when the operating member is located at the accelerator idle position, and the contact portion is arranged at the second distance from the rotary shaft. Differently from the comparative example, according to the accelerator device in the present disclosure, the first contact portion is arranged at the first distance from the rotary shaft. Therefore, volume of impact noise caused by contact of the first contact portion with the inner wall can be reduced from that in the comparative example. When abrasion or creep is generated on the first contact portion, the second contact portion is brought into contact with the inner wall, similarly to the first contact portion. In this case, force applied to the operating member from the inner wall is distributed to the first contact portion and the second contact portion. Therefore, the first contact portion can be protected from further abrasion and creep.

The present disclosure can be implemented by various forms other than the accelerator device. For example, the present disclosure can be implemented in an engine system including an accelerator device, a vehicle including an accelerator device, and the like.

A. First Embodiment

An accelerator device 10 shown in FIG. 1 is equipped in a vehicle and is an input device operated by a driver so as to control an opening degree of an unillustrated throttle valve of an engine for the vehicle. An X direction, a Y direction, and a Z direction shown in FIG. 1 are three spatial axes and are orthogonal to each other. The X direction, the Y direction, and the Z direction in FIG. 1 respectively correspond to X direction, the Y direction, and the Z direction in other drawings. The accelerator device 10 includes a housing 100, a rotary shaft 200, an operating member 300, and a biasing member 400.

The housing 100 is attachable to a vehicle body of the vehicle. In the present embodiment, a surface of the housing 100 facing +X-side in the X direction is fixed to the vehicle body of the vehicle. The housing 100 includes an inner wall 130. The inner wall 130 is provided along the Z direction and has a surface facing −X-side in the X direction. The housing 100 houses the rotary shaft 200, the operating member 300, and the biasing member 400.

The rotary shaft 200 extends along the Y direction. The rotary shaft 200 is configured to rotate integrally with the operating member 300. In other words, the rotary shaft 200 supports the operating member 300 rotatably.

The operating member 300 extends in a radial direction of the rotary shaft 200. A pedal arm 310 is connected to the operating member 300. One end of the pedal arm 310 on the +Z-side in the Z direction is connected to the operating member 300. The other end of the pedal arm 310 on the −Z-side in the Z direction is connected to an unillustrated accelerator pedal which receives input of an acceleration request from the driver of the vehicle. In the present embodiment, the operating member 300 and the pedal arm 310 are produced separately, and the pedal arm 310 is connected to the operating member 300. However, in the other embodiment, the operating member 300 and the pedal arm 310 may be formed integrally.

The operating member 300 is movable in an opening direction OD and a closing direction CD as the rotary shaft 200 rotates. The operating member 300 is biased in the closing direction CD. The operating member 300 moves counterclockwise from an accelerator idle position (shown in FIG. 1) in the rotational direction when the operating member 300 is moved the opening direction OD. The closing direction CD is a direction in which the operating member 300 moves clockwise in the rotational direction.

The biasing member 400 is disposed at a side of a first contact portion 330 with respect to the rotary shaft 200 on the +Z-side in the Z direction. The biasing member 400 is in contact with a surface of the operating member 300 which faces the −X-side in the X direction and biases the operating member 300 to the +X-side in the X direction. In other words, the biasing member 400 biases the operating member 300 so as to move in the closing direction CD. When the accelerator pedal does not receive the input of the acceleration request from the driver of the vehicle, the operating member 300 is located at the accelerator idle position as the biasing member 400 biases the operating member 300. When the accelerator pedal receives the input of the acceleration request from the driver of the vehicle, and when the input is larger than biasing force of the biasing member 400, the operating member 300 is moved rotationally from the accelerator idle position in the opening direction OD. In the present embodiment, the biasing member 400 is a coil spring.

The operating member 300 includes the first contact portion 330 and a second contact portion 350. The first contact portion 330 is provided on a part of a surface of the operating member 300 that faces the +X-side in the X direction and protrudes to the +X-side in the X direction. The first contact portion 330 is located at a first distance L1 from a shaft center of the rotary shaft 200. Specifically, the first distance L1 is from the shaft center of the rotary shaft 200 to a center of the first contact portion 330 in the Z-direction when the operating member 300 is located at the accelerator idle position. As the operating member 300 is located at the accelerator idle position, the first contact portion 330 is deformed by being brought into contact with the inner wall 130 facing the −X-side in the X direction in the housing 100.

The second contact portion 350 is provided on a part of a surface of the operating member 300 that faces the +X-side in the X direction and protrudes to the +X-side in the X direction. The second contact portion 350 is located at a second distance L2 from the shaft center of the rotary shaft 200. The second distance L2 is larger than the first distance L1. Similarly to the first contact portion 330, the second distance L2 is from the shaft center of the rotary shaft 200 to a center of the second contact portion 350 in the Z-direction when the operating member 300 is located at the accelerator idle position.

Figure 2:
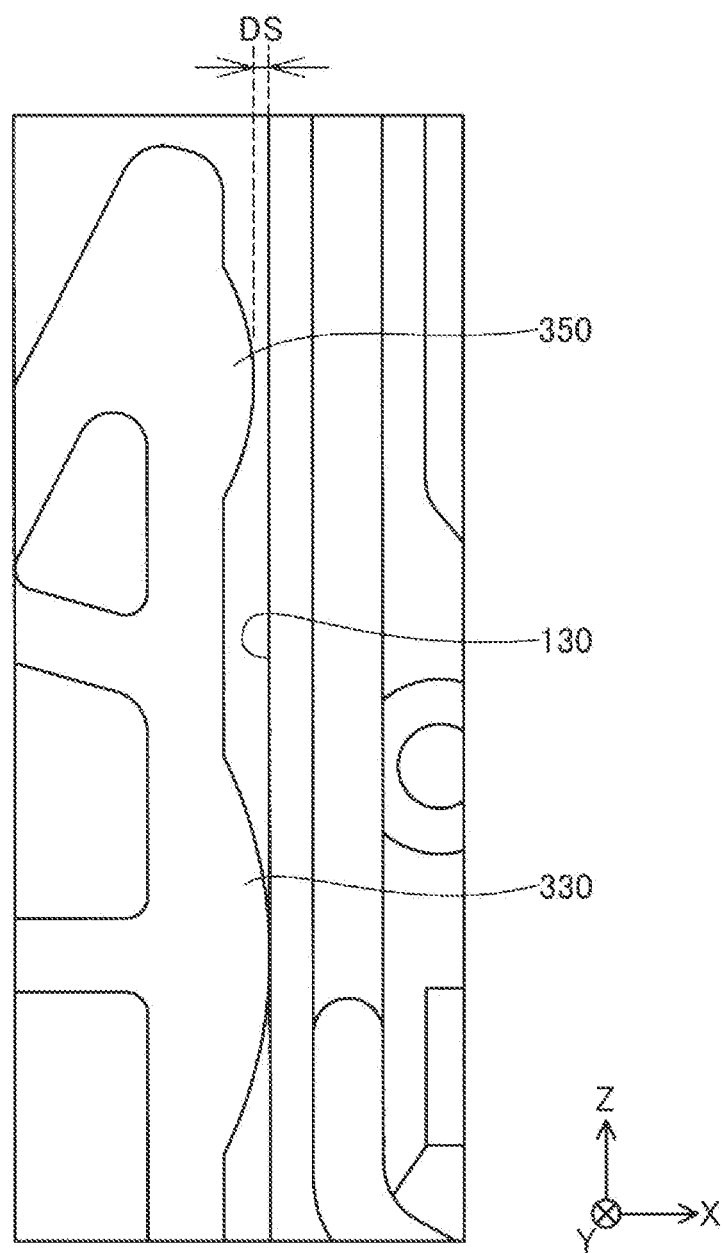
FIG. 2 is an enlarged view showing a first contact portion and a second contact portion.

FIG. 2 is an enlarged view showing a periphery of the first contact portion 330 and the second contact portion 350. When the operating member 300 is located at the accelerator idle position in a state where the first contact portion 330 has an initial shape, the second contact portion 350 is located to have a predetermined distance DS from the inner wall 130. The initial shape means a shape of the first contact portion 330 without deformation after the accelerator device 10 is manufactured. When the operating member 300 is located at the accelerator idle position in the state where the first contact portion 330 has the initial shape, the first contact portion 330 is in contact with the inner wall 130 while the second contact portion 350 is not in contact with the inner wall 130.

Figure 3:
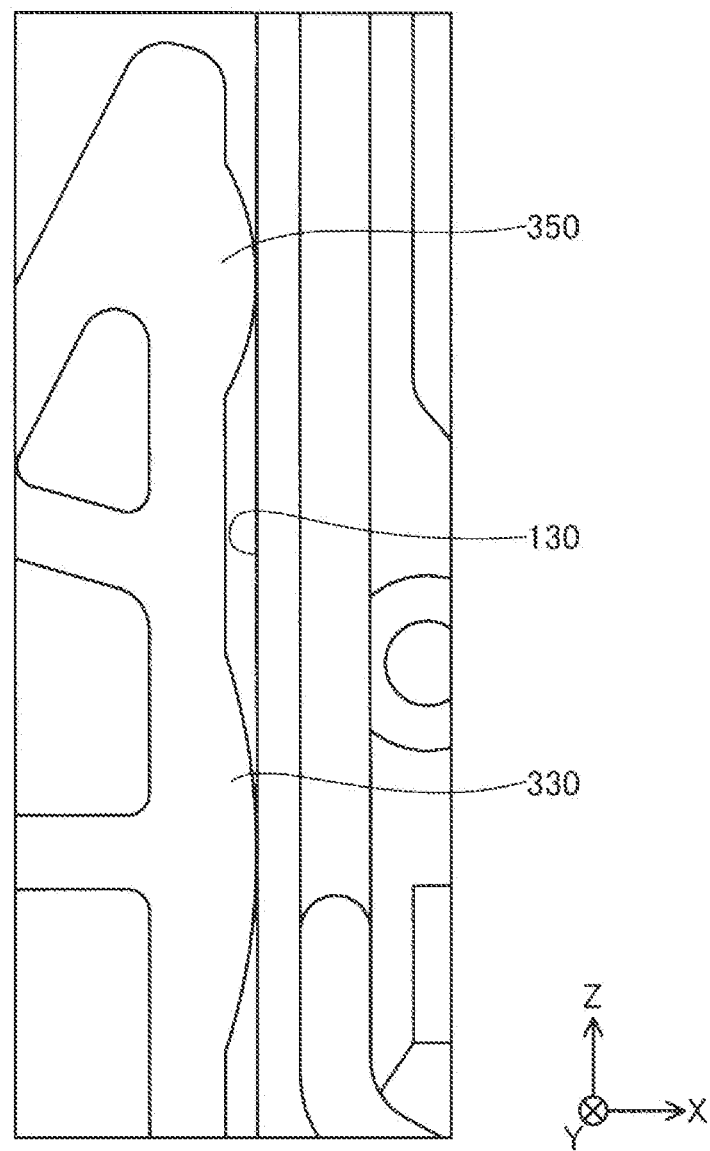
FIG. 3 is an enlarged view showing a first contact portion and a second contact portion.

FIG. 3 is an enlarged view showing a periphery of the first contact portion 330 and the second contact portion 350. Differently from a state shown in FIG. 2, in FIG. 3, the first contact portion 330 is deformed more than or equal to a predetermined volume from the initial shape due to abrasion or creep. In addition, FIG. 3 shows the second contact portion 350 in contact with the inner wall 130 after deformation of the first contact portion 330.

The abrasion and the creep may cause the deformation of the first contact portion 330 from the initial shape. The abrasion or the creep may be caused by a contact between the first contact portion 330 and the inner wall 130 when the operating member 300 returns to the accelerator idle position in the closing direction CD after moving in the opening direction OD. The abrasion means that a surface of the first contact portion 330 is worn down due to repeated contacts between the first contact portion 330 and the inner wall 130. The creep means that the first contact portion 330 is plastically deformed so as to sink to the −X-side in the X direction by receiving stress from the inner wall 130. As the first contact portion 330 is deformed more than or equal to the predetermined volume from the initial shape due to the abrasion or the creep, the second contact portion 350 is configured to be brought into contact with the inner wall 130 when the operating member 300 is located at the accelerator idle position. The predetermined volume is a preset deformation volume of the first contact portion 330 deformed due to the abrasion or the creep in a period from a start of use of the accelerator device 10 to a start of contact between the second contact portion 350 and the inner wall 130. The present amount changes depending on the set of the distance DS.

In the accelerator device 10 in the present embodiment, in case where the first contact portion 330 has the initial shape, when the operating member 300 is located at the accelerator idle position, only the first contact portion 330 is in contact with the inner wall 130 while the second contact portion 350 is not, as described with reference to FIGS. 2 and 3. When the first contact portion 330 is deformed from the initial shape more than or equal to the predetermined volume due to the abrasion or the creep, and when the operating member 300 is located at the fully closed state, both the first contact portion 330 and the second contact portion 350 are in contact with the inner wall 130. In addition, the operating member 300 may be plastically deformed by large force transmitted through the accelerator pedal due to a load applied to the accelerator pedal in the closing direction CD. In this case, when the operating member 300 is located at the accelerator idle position, the first contact portion 330 and the second contact portion 350 may be in contact with the inner wall 130.

Figure 4:
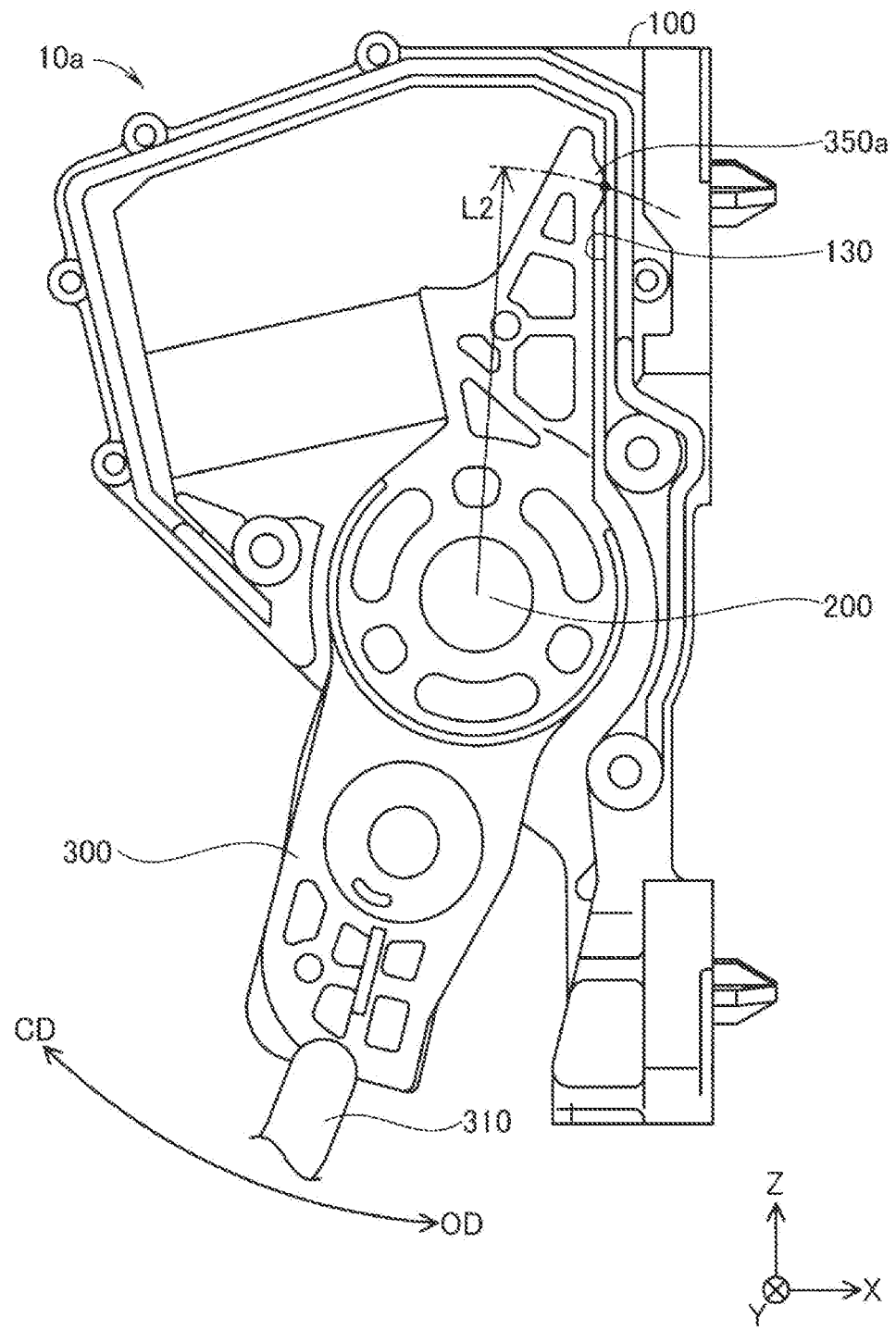
FIG. 4 is a schematic view illustrating an accelerator device in a comparative example.

FIG. 4 shows an accelerator device 10a in a comparative example. The accelerator device 10a has the same structure as the accelerator device 10 in the first embodiment, except for including a contact portion 350a instead of the first contact portion 330 and the second contact portion 350.

The contact portion 350a is provided on a surface of the operating member 300 that faces the +X-side in the X direction and protrudes to the +X-side in the X direction. The contact portion 350a is located at the second distance L2 from the shaft center of the rotary shaft 200. When the operating member 300 is located at the accelerator idle position, the contact portion 350a is brought into contact with the inner wall 130.

The contact portion 350a is located at the second distance L2 from the shaft center of the rotary shaft 200. In contrast, in the present embodiment, the first contact portion 330 is located at the first distance L1 from the shaft center of the rotary shaft 200. In addition, the first distance L1 is shorter than the second distance L2 in the present embodiment. As a result, a velocity in which the first contact portion 330 is brought into contact with the inner wall 130 in the present embodiment is smaller than a velocity in which the contact portion 350a is brought into contact with the inner wall 130 in the comparative example. Therefore, in the present embodiment, volume of impact noise caused by contact of the first contact portion 330 with the inner wall 130 can be reduced.

In the present embodiment, the contact of the first contact portion 330 on the inner wall 130 may cause the abrasion or the creep on the first contact portion 330. In this case, when the operating member 300 is located at the accelerator idle position, the second contact portion 350 is brought into contact with the inner wall 130, similarly to the first contact portion 330. Therefore, compared to a structure in which the inner wall 130 is in contact only with the first contact portion 330, force applied from the inner wall 130 to the operating member 300 is distributed to the first contact portion 330 and the second contact portion 350. Therefore, further abrasion or creep on the first contact portion 330 can be restricted.

Figure 5:
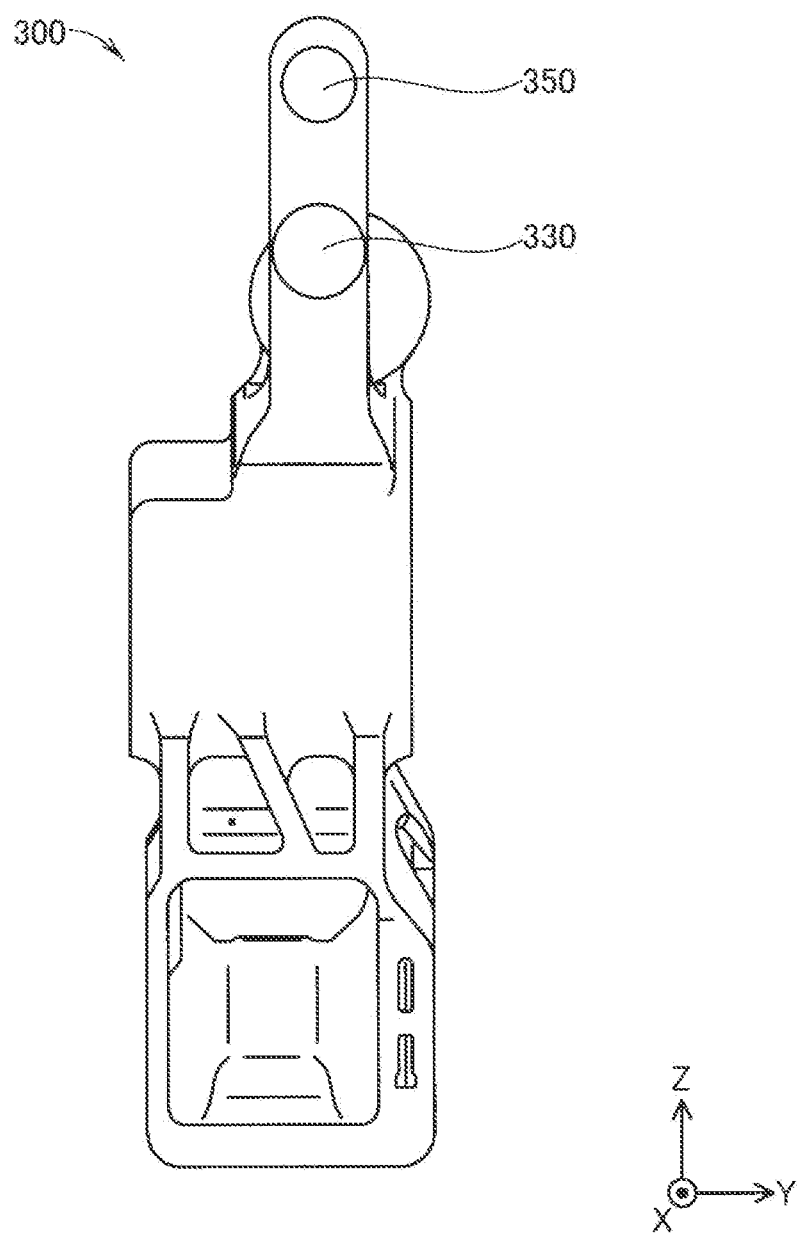
FIG. 5 is a schematic view illustrating an operating member.

FIG. 5 shows the operating member 300 viewed from the +X-side in the X direction. Each of the first contact portion 330 and the second contact portion 350 has a curved surface shape. Further, in the present embodiment, each of the first contact portion 330 and the second contact portion 350 has a spherical shape. That is, the contact between the first contact portion 330 or the second contact portion 350 and the inner wall 130 corresponds to a contact between a spherical surface and a surface. Here, transmit process of the stress from the inner wall 130 to the first contact portion 330 will be described with an example of change in a contact state between the first contact portion 330 and the inner wall 130. At a time of contact between the first contact portion 330 and the inner wall 130, a point on the spherical surface of the first contact portion 330 is in contact with the inner wall 130. After that, as the operating member 300 is pressed further onto the inner wall 130 in the closing direction CD, the first contact portion 330 is distorted to the −X-side in the X direction. As deformation volume is increased on the spherical surface of the first contact portion 330, the stress transmitted from the inner wall 130 to the first contact portion 330 is increased.

In a comparative example, an accelerator device includes a first contact portion 330 formed in a flat shape. The flat surface of the first contact portion 330 is in contact with a flat surface of an inner wall 130. In this case, a contact area at the time of the contact between the first contact portion 330 and the inner wall 130 is larger than that in the present embodiment. Therefore, since a first contact between the first contact portion 330 and the inner wall 130, stress transmitted from the inner wall 130 to the first contact portion in the comparative example is relatively larger than that in the present embodiment. In contrast, in the present embodiment, a contact area between the first contact portion 330 and the inner wall 130 is small when the first contact portion 330 and the inner wall 130 are in contact with each other. After that, the contact area is gradually increased as the operating member 300 is moved in the closing direction CD. Therefore, the stress transmitted to the first contact portion 330 is increased as the contact area increases. Because of this, when the operating member 300 is moved to the accelerator idle position, a time to complete transmission of the stress from the inner wall 130 to the first contact portion 330 in the accelerator device 10 of the present embodiment can be longer than that in the comparative example.

As a result of study by the inventors, as the time period taken for completing the transmission of the stress is longer, a frequency of the impact noise caused by the contact between the first contact portion 330 and the inner wall 130 becomes lower than that when the time period is shorter. A tone of the impact noise at the low frequency is lower than that at the high frequency. Therefore, discomfort to the driver due to the impact noise can be reduced.

When the operating member 300 is assembled to the housing 100, the first contact portion 330 or the second contact portion 350 may be in contact with the inner wall 130 at an angle different from a target angle. Even in this case, as each of the first contact portion 330 and the second contact portion 350 has the spherical shape, affect caused by the incorrect angle can be reduced, compared with a case where each of the first contact portion 330 and the second contact portion 350 has a curved surface shape but not the spherical surface shape.

Figure 6:
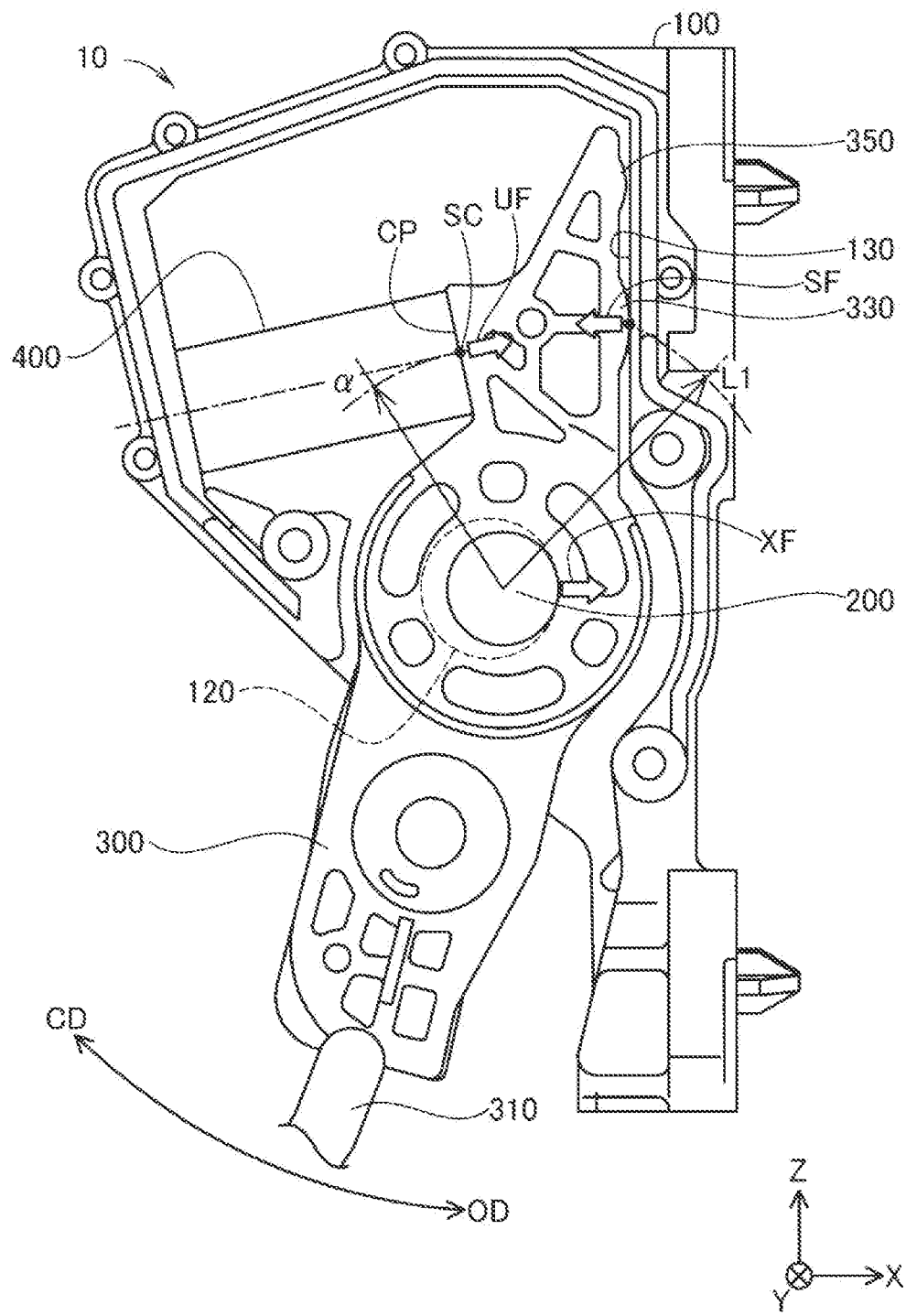
FIG. 6 is a schematic view illustrating a bearing in the accelerator device.

FIG. 6 shows a bearing 120 of the accelerator device 10 arranged in the housing 100. When the accelerator device 10 is viewed from the −Y-side in the Y direction, the bearing 120 is invisible behind the operating member 300 in FIG. 1. However, for convenience of explanation, the bearing 120 is shown by a broken line in FIG. 6. The bearing 120 is formed in a tubular shape and supports the rotary shaft 200. As a diameter of the bearing 120 is larger than a diameter of the rotary shaft 200, a gap is formed between the bearing 120 and the rotary shaft 200 while the bearing 120 supports the rotary shaft 200.

An arrangement relationship between the biasing member 400 and the first contact portion 330 will be described with reference to FIG. 6. FIG. 6 shows the accelerator device 10 when the operating member 300 is located at the accelerator idle position. In the accelerator device 10, the biasing member 400 and the operating member 300 are in contact with each other at a contact part CP. The contact part CP intersects with a central axis of the biasing member 400 at an intersection point SC. A third distance a from the intersection point SP to the shaft center of the rotary shaft 200 is less than the first distance L1. Here, a biasing force UF is applied from the biasing member 400 to the operating member 300, and a stress SF is transmitted from the inner wall 130 to the first contact portion 330. In the arrangement relationship, a distance between a position at which the biasing force UF is generated and the rotary shaft 200 is smaller than a distance between a position at which the stress SF is generated and the rotary shaft 200. Therefore, the rotary shaft 200 biases the bearing 120 to the +X-side in the X direction at a position deviated to the +X-side in the X direction in the bearing 120. Force in which the rotary shaft 200 biases the bearing 120 is illustrated as biasing force XF in the drawings.

Figure 7:
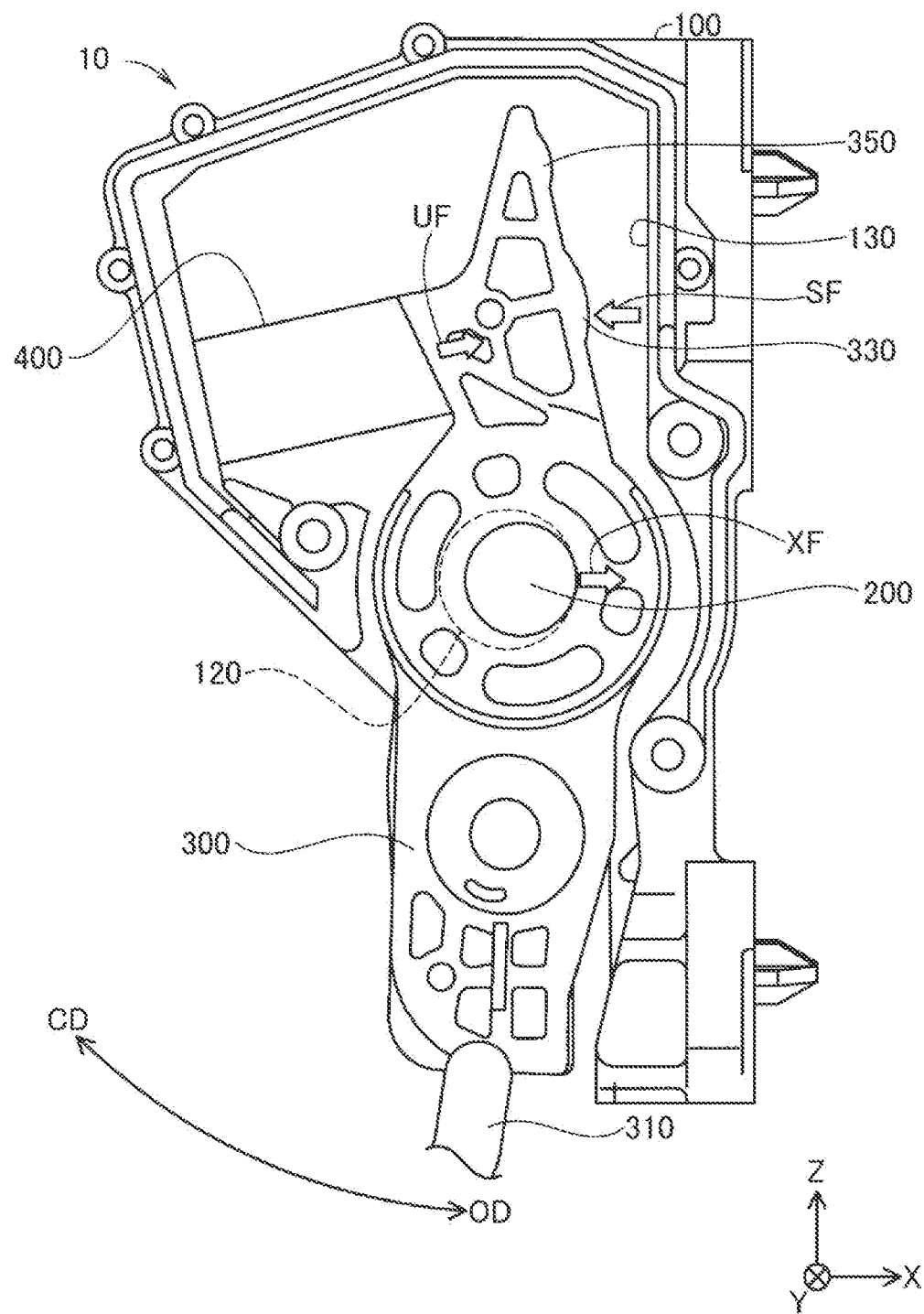
FIG. 7 is a schematic view illustrating the accelerator device when the operating member is moved in an opening direction.

FIG. 7 shows the accelerator device 10 when the operating member 300 is moved in the opening direction OD from a state shown in FIG. 6. When transmitting from the state in FIG. 6 to a state in FIG. 7, that is, when the operating member 300 is moved in the opening direction OD, the rotary shaft 200 deviated to the +X-side in the X direction in the bearing 120 continues to bias the bearing 120 to the +X-side in the X direction. In other words, the rotary shaft 200 located in the bearing 120 rotates the operating member 300, while the rotary shaft 200 maintains in contact with the bearing 120.

Figure 8:
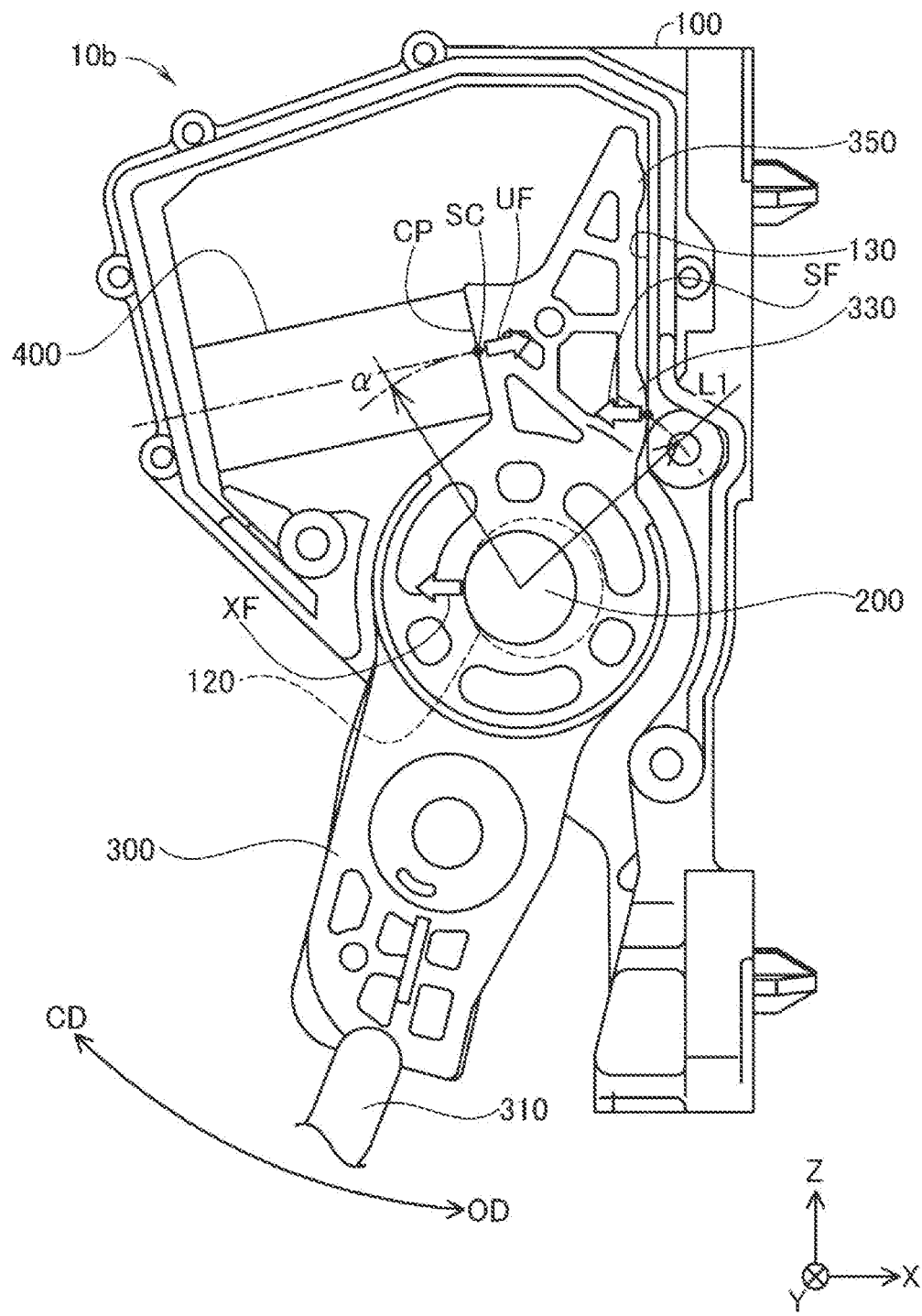
FIG. 8 is a schematic view illustrating an accelerator device in a comparative example.

FIG. 8 shows an accelerator device 10b in a comparative example. The accelerator device 10b has a configuration same as the accelerator device 10 in the first embodiment, except an arrangement relationship between the biasing member 400 and the first contact portion 330. FIG. 8 shows the accelerator device 10b when the operating member 300 is located at the accelerator idle position, similarly to FIG. 6.

In the accelerator device 10b, a third distance a is longer than a first distance L1. The stress SF is transmitted from the inner wall 130 to the first contact portion 330, and the biasing force UF is applied from the biasing member 400 to the operating member 300. In the arrangement relationship of the comparative example, a distance between a position on which the stress SF is generated and the rotary shaft 200 is smaller than a distance between a position on which the biasing force UF is generated and the rotary shaft 200. The rotary shaft 200 biases the bearing 120 to the −X-side in the X direction at a position deviated to the −X-side in the X direction in the bearing 120.

Figure 9:
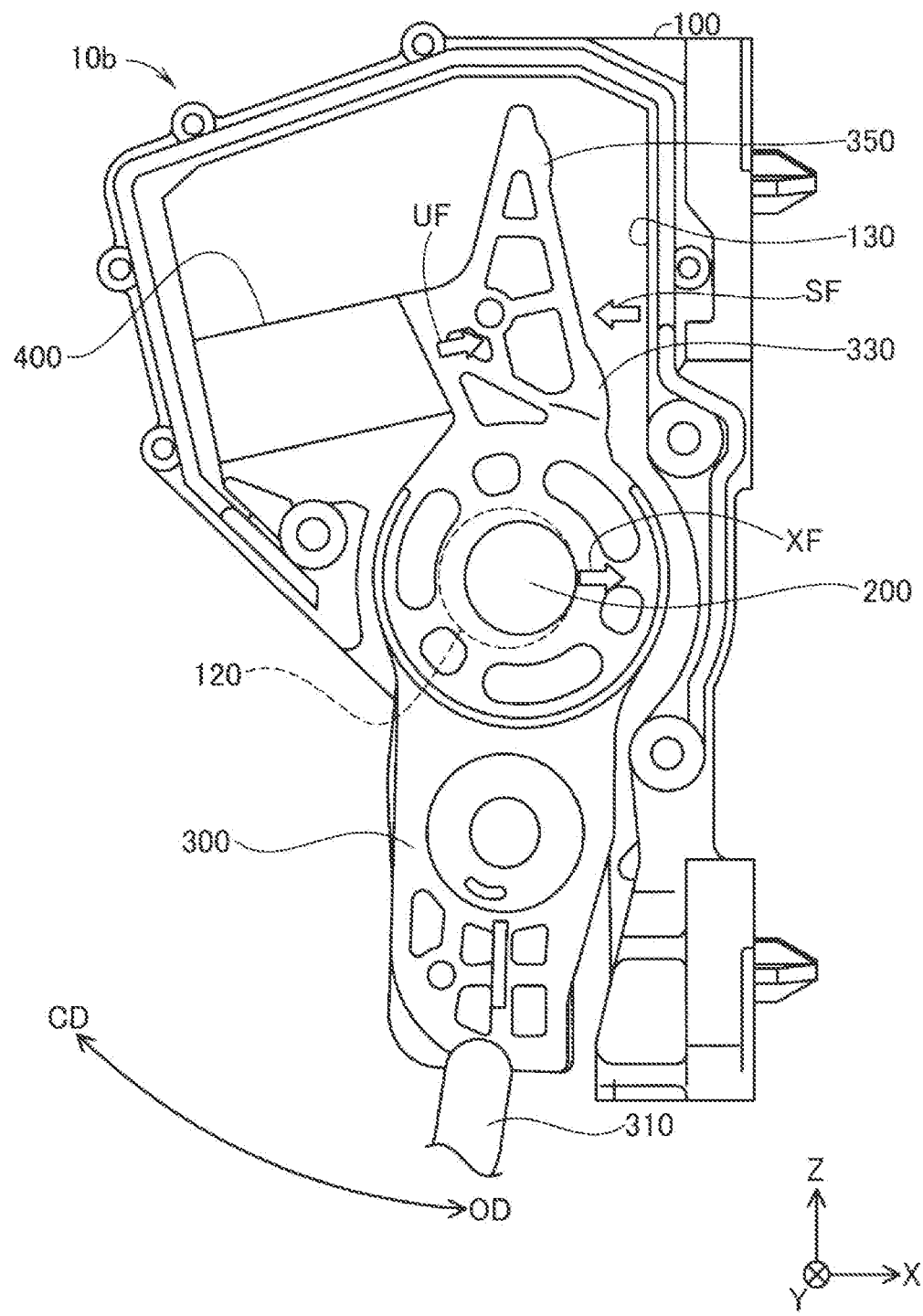
FIG. 9 is a schematic view illustrating the accelerator device in the comparative example when the operating member is moved in an opening direction.

FIG. 9 shows the accelerator device 10b when the operating member 300 is moved in the opening direction OD from a state shown in FIG. 8. When transmitting from the state in FIG. 8 to a state in FIG. 9, that is, when the operating member 300 is moved from the accelerator idle position in the opening direction OD, the rotary shaft 200 is moved from the position deviated to the −X-side to a position deviated to the +X-side in the X direction in the bearing 120. Because of this, the rotary shaft 200 biases the bearing 120 to the +X-side in the X direction. At this point, the driver of the vehicle may feel uncomfortable when inputting an acceleration request through the accelerator pedal, because the position of the rotary shaft 200 is moved from the −X-side to the +X-side in the X direction in the bearing 120.

According to the accelerator device 10 of the present embodiment, when the operating member 300 is moved in the opening direction OD, the rotary shaft 200 keeps the state deviated to the +X-side in the bearing 120 to bias the bearing 120 to the +X-side in the X direction. Therefore, the driver is restricted from feeling uncomfortable while pressing the operating member 300 in the opening direction OD.

In the embodiment described above, the impact noise generated by the contact of the first contact portion 330 with the inner wall 130 can be reduced. Further, in the embodiment described above, in addition to the first contact portion 330, the second contact portion 350 is also brought into contact with the inner wall 130 as the abrasion or the creep is generated on the first contact portion 330. Accordingly, the force applied from the inner wall 130 to the operating member 300 is distributed to the first contact portion 330 and the second contact portion 350. Therefore, the abrasion or the creep on the first contact portion 330 can be further restricted.

B. Other Embodiments

Figure 10:
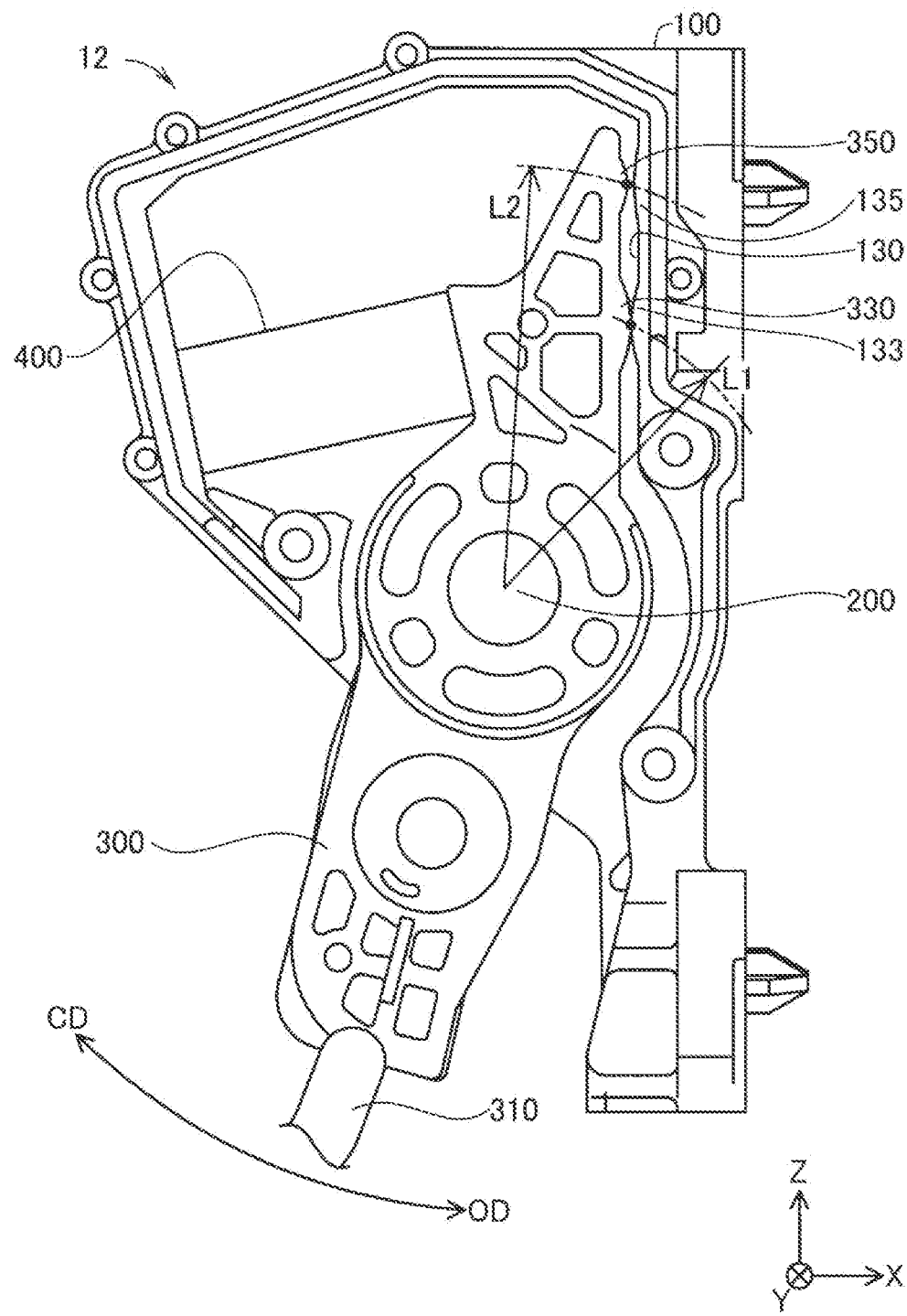
FIG. 10 is a schematic view illustrating an accelerator device according to another embodiment.

FIG. 10 shows an accelerator device 12 in the other embodiment. The accelerator device 12 has a configuration same as the accelerator device 10 in the first embodiment, except that an inner wall 130 includes a first curved portion 133 and a second curved portion 135 in the other embodiment. Each of the first curved portion 133 and the second curved portion 135 has a curved surface shape and protrudes from the inner wall 130 to the −X-side in the X direction. The first curved portion 133 is located so as to be brought into contact with the first contact portion 330 when the operating member 300 is located at the accelerator idle position. The second curved portion 135 is located so as to be brought into contact with the second contact portion 350 as the first contact portion 330 is deformed more than or equal to the predetermined volume from the initial shape due to the abrasion or the creep. A time period taken for completing the transmission of the stress from the inner wall 130 to the first contact portion 330 and the second contact portion 350 can be made longer when the operating member 300 is moved to the accelerator idle position.

In the accelerator device 10 of the above embodiments, both the first contact portion 330 and the second contact portion 350 have spherical shapes, but the present disclosure is not limited to this. For example, both of the first contact portion 330 and the second contact portion 350 may have curved surface shapes different from the spherical shapes, or one of them may have a spherical shape while the other have a curved surface shape different from the spherical shape.

Further, one of the first contact portion 330 and the second contact portion 350 may have a curved surface shape. Each of the first contact portion 330 and the second contact portion 350 preferably has a shape in which a cross-sectional area increases as farther from the inner wall 130. Thereby, the contact area between the inner wall 130 and the first contact portion 330 or the second contact portion 350 is small at a moment of the contact and gradually increased as the operating member 300 is moved in the closing direction CD.

Configurations of the accelerator device 10 in the above embodiments may be applied to a device including a clutch pedal and a brake pedal.

The present disclosure should not be limited to the embodiments or modifications described above, and various other embodiments may be implemented without departing from the scope of the present disclosure. For example, the technical features in each embodiment corresponding to the technical features in the form described in the summary may be used to solve some or all of the above-described issues, or to provide one of the above-described effects. In order to achieve a part or all, replacement or combination can be appropriately performed. In addition, as long as a technical feature is not described as essential in the present specification, the technical feature may be deleted as appropriate.

What is claimed is:

1. An accelerator device comprising:
    a housing configured to be attached to a vehicle body;
    a rotary shaft supported in the housing and configured to rotate; and
    an operating member configured to be moved between an accelerator idle position and an accelerator full-throttle position, the operating member being biased toward the accelerator idle position, wherein
    the operating member includes
        a first contact portion arranged at a first distance from the rotary shaft and configured to be deformed by a contact with an inner wall of the housing when the operating member is located at the accelerator idle position, and
        a second contact portion arranged at a second distance longer than the first distance from the rotary shaft,
    when the first contact portion has an initial shape and the operating member is located at the accelerator idle position, the second contact portion is arranged at a predetermined distance from the inner wall, and
    when the first contact portion is deformed more than a predetermined volume from the initial shape and the operating member is located at the accelerator idle position, the second contact portion is in contact with the inner wall.

2. The accelerator device according to claim 1, wherein the first contact portion has a curved surface shape.

3. The accelerator device according to claim 1, wherein the second contact portion has a curved surface shape.

4. The accelerator device according to claim 1, further comprising:
    a biasing member disposed on a side of the first contact portion from the rotary shaft to bias the operating member toward the accelerator idle position, wherein
    the operating member rotates integrally with the rotary shaft,
    the housing includes a bearing formed in a tubular shape to support the rotary shaft,
    a diameter of the bearing is larger than a diameter of the rotary shaft,
    the biasing member and the operating member are in contact with each other at a contact part, and the contact part intersects a central axis of the biasing member at an intersection,
    a third distance is from the intersection to the rotary shaft, and
    the third distance is shorter than the first distance.

* * * * *